Figure 1:
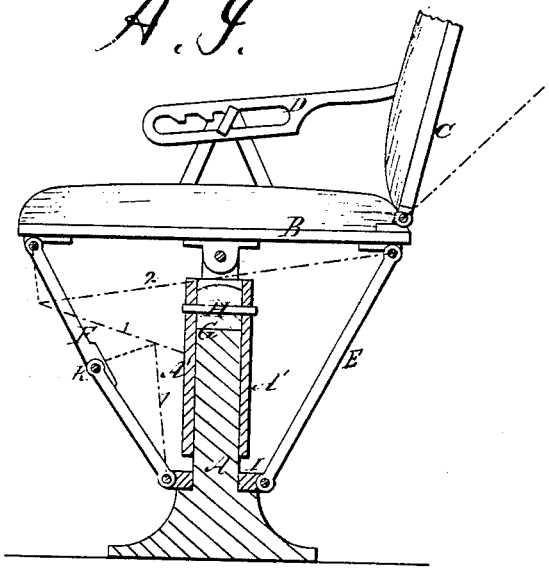
Figure 2:
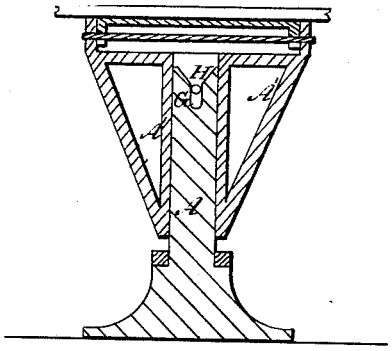

J. Hartman, Jr.

Seat & Couch.

No. 314. ~~Patented~~ Feb. 26, 1861.

A. J.

[illegible] d by [illegible] ball val[illegible]
[illegible] the [illegible]

[illegible] be particular [illegible] shown and 1656
x1624
x1194

Witnesses.

Benj Morrison

James W Mahon

Inventor.

Jno Hartman Jr